United States Patent [19]
Dahlstrom

[11] 3,951,005
[45] Apr. 20, 1976

[54] MULTIPLE ARM SPEED REDUCER

[75] Inventor: Arvid Dahlstrom, Chicago, Ill.

[73] Assignee: Dahltron Corporation, Oak Brook, Ill.

[22] Filed: Sept. 16, 1974

[21] Appl. No.: 506,594

[52] U.S. Cl................................ 74/125.5; 74/116; 74/526
[51] Int. Cl.² ......................................... F16D 27/10
[58] Field of Search ................. 74/55, 63, 116, 120, 74/125.5, 526

[56] References Cited
UNITED STATES PATENTS

| | | | |
|---|---|---|---|
| 2,596,362 | 5/1952 | Brandt et al. | 74/526 |
| 3,111,851 | 11/1963 | Liesen | 74/526 |
| 3,557,631 | 1/1971 | Dahlstrom | 74/125.5 |

*Primary Examiner*—Kenneth W. Sprague
*Assistant Examiner*—James C. Yeung
*Attorney, Agent, or Firm*—Edward D. Gilhooly

[57] ABSTRACT

A speed reducing assembly including a series of arms transferring force from any input power shaft to a driven output shaft. Uncoupling means are associated with said arms for disengaging any number thereof without interference in the force transfer of any of which might be still engaged for selective control of the power and/or speed of the output shaft.

7 Claims, 4 Drawing Figures

MULTIPLE ARM SPEED REDUCER

BACKGROUND OF THE INVENTION

The invention relates to speed reducing assemblies and more particularly, to a speed reducing assembly having a series of power transferring arms with uncoupling means associated therewith.

Speed reducing assemblies such as discussed in my co-pending application Ser. No. 506,538 filed concurrently herewith and in my reissued U.S. Pat. No. Re28122 are fulfilling a need in the industry. These assemblies are compact, have few moving parts, are relatively safe to employ and easy to repair. These assemblies are a substantial improvement over those of the prior art which involved cables, pullies, gear means etc. in order to reduce a high speed input to a low speed output.

In order to increase the versatility of my speed reducer assemblies above identified, I have developed an improvement wherein the series of force transferring arms have uncoupling or disengaging means connected therewith. This allows the operator to change the speed of the output shaft simply by coupling or uncoupling the desired number of the forced transferring arms. This speed change can be accomplished by the simple flipping of a lever.

It is therefore an object of this invention to provide a speed reduction assembly wherein the output speed may be varied regardless of the input speed.

Yet another of this invention is to provide a force reducing assembly having a series of driving arms with uncoupling means associated therewith.

Other objects and advantages of this invention will become apparent from the following description taken in connection with the accompanying drawings, wherein are set forth by way of illustration and examples certain embodiments of this invention:

While there has been described what is at present considered to be the preferred embodiment of the invention, it will be understood that various modifications may be made therein, and it is intended to cover in the appended claims all such modifications as follows in the true spirit and scope of the invention.

Figure 1:
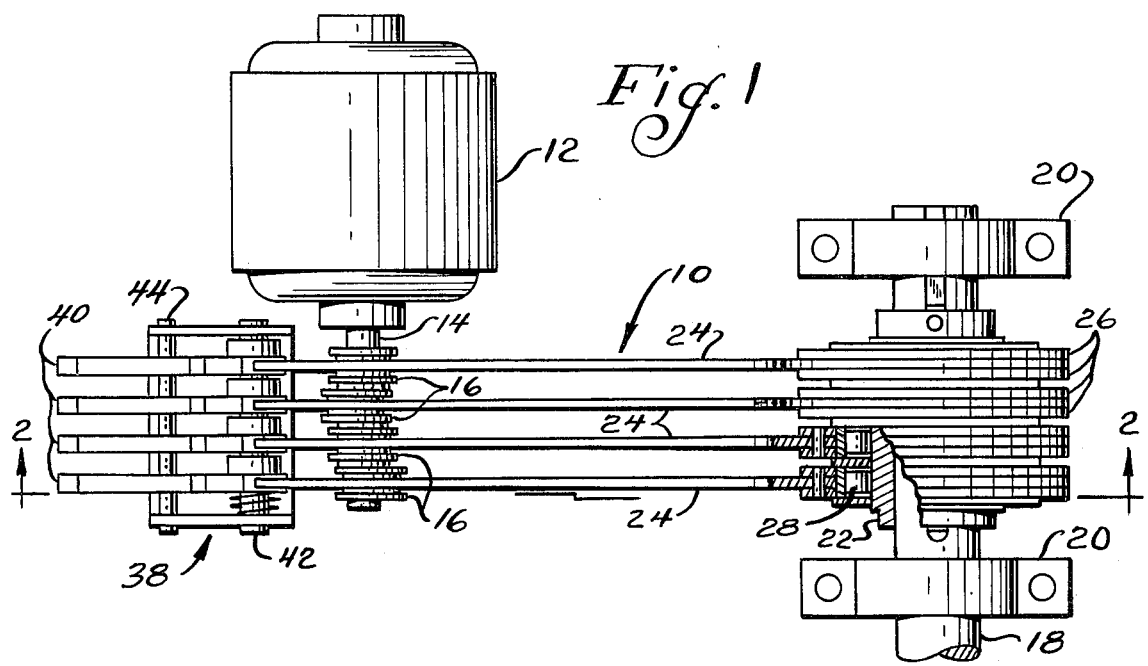
FIG. 1 is to an elevational view partially broken away of the speed reduction assembly.

Referring now to the drawings and more particularly to FIG. 1 wherein is shown the speed reduction assembly means 10. A constant speed electrical motor means 12 drives an input shaft means 14. The shaft means being provided with a series of eccentric means 16, each being provided with an aperture through which the shaft 14 passes. It should be noted that the number of eccentric means 16 positioned on shaft means 14 is a matter of design choice. However, in order for the assembly to function in an optimum manner, it is desirable that the eccentric means be angularly oriented to the axis of rotation of the shaft equally from each other. That is, three eccentric means must be spaced apart by 120°, 4 would be spaced 90° etc. Power is transferred from the input shaft 14 to an output shaft means 18 which as shown in FIG. 1 has its own independent set of bearings 20. It may be, however, that output shaft means is supported by the bearing set of the assemblage over which it is driving. The output shaft is keyed to a sleeve or clutched member 22 such that they both move as a single unit.

The speed reducer assembly 10 extending between the input shaft 14 and the driven output shaft 18 includes a series of force transfer arm means 24, spacer means 26 and clutching assembly 28.

Figure 2:
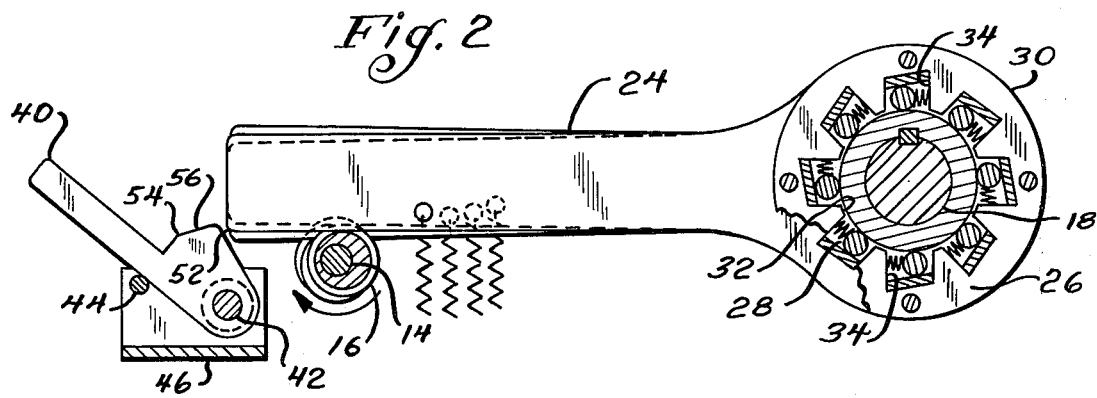
FIG. 2 is a view taken along the line 2—2 of FIG. 1.

From a consideration of a single force transfer arm 24, as shown in FIG. 2, and reference to my copending application and previously reissued patent as mentioned earlier, a full and complete understanding of the manner in which force is transferred will be seen. Very simply, as the eccentric means 16 rotates arm means 24 is very rapidly moved up and down in a rocking motion, located within the second end means 30 is an aperture means 32 having channel means 34 therein. As arm means 24 is moved upwardly by the eccentric means 16 the roller sprag means 28 of the clutch means 31 is pinched between the bottom of the channel means 24 and the sleeved means 22. It should be noted that movement of the arm means is necessary before the roller sprag is pushed into this engaging position. Once this pinched position is achieved, force is delivered through the clutched or sleeve means 22 to the output shaft.

The disengaging assembly means 38 includes a series of individual lever means 40 each situated and designed to disengage a single arm means 24. For example, referring to FIGS. 2 and 3, if the lever means 40 engages the first end means 38 of arm means 24 and raises it above the eccentric means 16 it is apparent that no rocking motion will be transferred to the clutch assembly 31. However, the remaining arm means in the series will continue to follow their work cycle. The sprag means 28 will simply roll within the channel as the sleeve means 22 is driven by the remaining functioning arm means 24, since the sprag means is not being pinched between the channel and the sleeve means 22.

Figure 3:
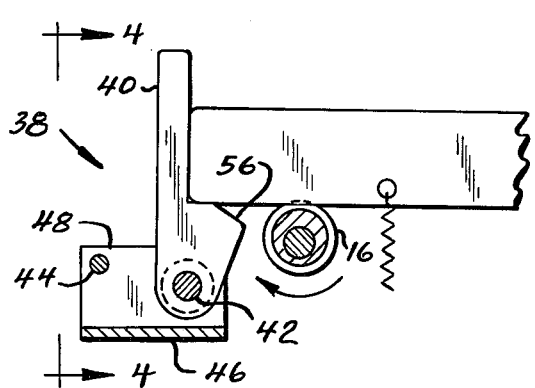
FIG. 3 is a partial side view of the uncoupling assembly associated with an individual arm.
Figure 4:
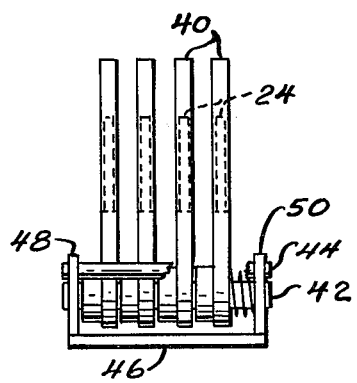
FIG. 4 is a view taken along the line 4—4 of FIG. 3.

The disengaging assembly means 38 can be positioned in any suitable location adjacent the arm means 24, it being necessary only that a selective one or more arm means be raised or otherwise moved sufficiently such that contact is not made with the eccentric means 16 as it passes through a full revolution and thus an impulse is not imparted to the output shaft. The disengaging means 38 includes a series of cammed lever means 40 pivotly mounted on a shaft means 42. Rearward movement to a disengaged position is controlled by a bar means 44 which extends between a series of plate means 46, 48 and 50. These plate means define a generally rectangular housing wherein the bar means 48 as well as the shaft means 42 are mounted. When it is desired to disengage an arm means as is shown in FIGS. 2 and 3 the cammed lever means 40 or any series thereof are swung to the right causing the leading edge 52 of arm means 24 to ride up on the cammed surface 54. The cammed surface 54 is comprised of 2 angled surfaces, a first surface 56 which raises the arm means 24 of the eccentric means 16 and a second surface where the arms can be conveniently held until it is desired to again engage it to increase the power/speed to output shaft 18.

From the foregoing it should be apparent that the speed and/or power transmitted to output shaft 18 can be quickly and effectively controlled by the mere engagement or disengagement of an arm means relative to eccentric 16. The technique herein employed in the invention of the application achieves increased versatility of operation with a device which is significantly less complex and expensive than the prior art. This improved performance has numerous applications where effective control of an output shaft is desired through the use of a device having minimum complexity.

There has thus been provided a speed reducing assembly comprising a series of individual force transferring arms and clutch assemblies. Associated therewith is an uncoupling means capable of uncoupling all of said arm means from the force generator force or simply disengaging individual arm members without interrupting force being transferred by the other members.

What is claimed is:

1. A speed reducer mechanism for drivably connecting a rotating power shaft to a driven shaft comprising:
   eccentric means coupled to said power shaft;
   a series of arm means having first and second end section means, said first end being operatively engaged to said eccentric means for effecting intermittent rocking movement of said arm means upon rotation of said power shaft, said second end being pivotly mounted about an axis coaxial to the longitudinal axis of the driven shaft;
   clutch means operatively imposed between said second end and said driven shaft for transferring said rocking movement to rotate said driven shaft;
   a respective uncoupling means operatively coupled to each of said arm means, and
   said uncoupling means operative to selectively disengage each of said arm means to vary the output speed of said power shaft dependent on the number of said series of arm means being disengaged.

2. The speed reducer mechanism of claim 1 wherein: said uncoupling means is positioned adjacent said first end means; and said first end means extends beyond said eccentric means.

3. The speed reducer mechanism of claim 1 wherein: said uncoupling means moves to contact said arm means, and carries said arm away from contact with said eccentric means.

4. The speed reducer mechanism of claim 1 wherein: said uncoupling means operatively coupled to said drive means includes a series of lever means individually actuatable.

5. The speed reducer mechanism of claim 1 wherein: said lever means movably engages said arm means whereby causing disengagement from said force transfer means.

6. The speed reducer mechanism of claim 5 wherein: said lever means include a first arm engaging position means and a second arm carrying position means.

7. The speed reducer mechanism of claim 6 wherein: said lever means are simultaneously actuatable.

* * * * *